(No Model.)
J. P. WECHSELBERG.
KING BOLT CONNECTION FOR VEHICLES.
No. 413,990. Patented Oct. 29, 1889.
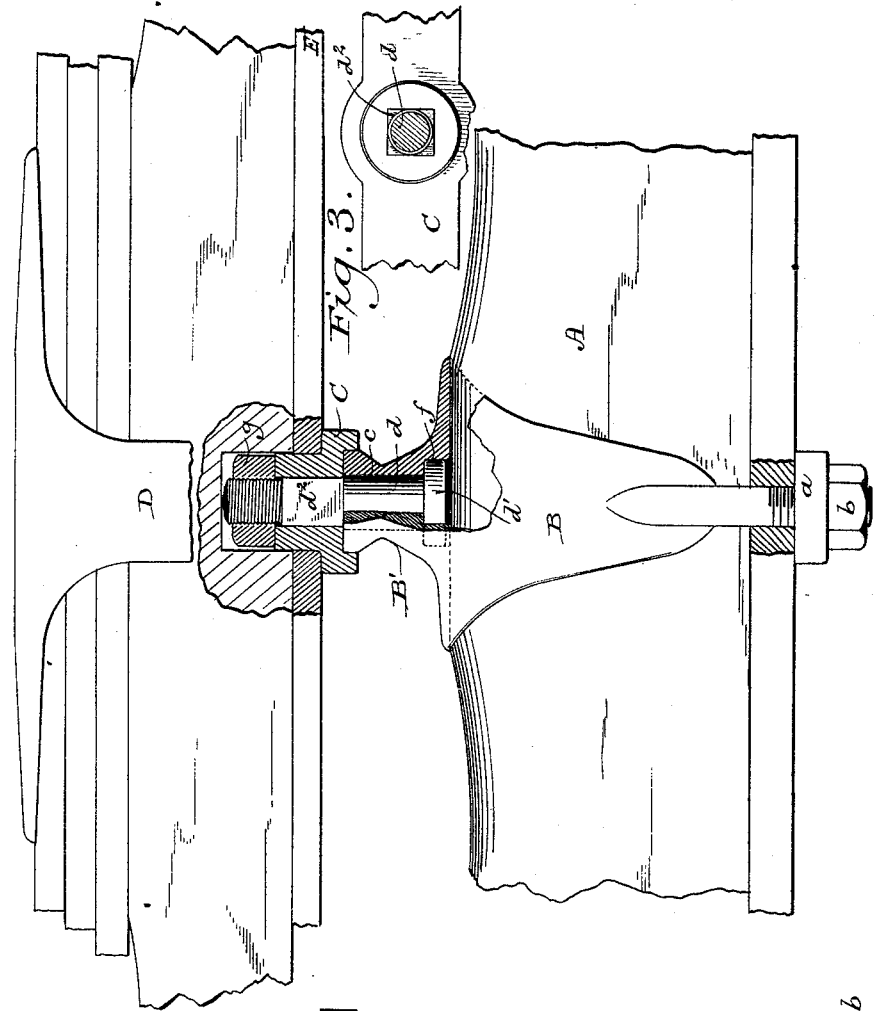
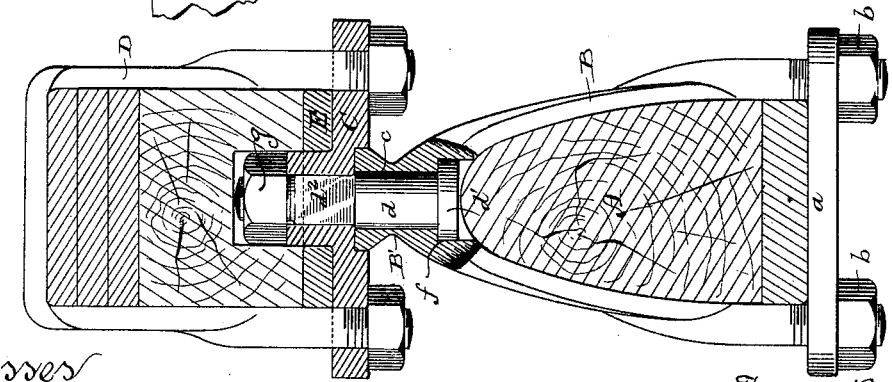

UNITED STATES PATENT OFFICE.

JOHN P. WECHSELBERG, OF MILWAUKEE, WISCONSIN.

KING-BOLT CONNECTION FOR VEHICLES.

SPECIFICATION forming part of Letters Patent No. 413,990, dated October 29, 1889.

Application filed August 26, 1889. Serial No. 321,931. (No model.)

*To all whom it may concern:*

Be it known that I, JOHN P. WECHSELBERG, of Milwaukee, in the county of Milwaukee, and in the State of Wisconsin, have invented certain new and useful Improvements in King-Bolt Connections for Vehicles; and I do hereby declare that the following is a full, clear, and exact description thereof.

My invention relates to king-bolts for vehicles, and will be fully described hereinafter.

In the drawings, Figure 1 is a cross-section of a front axle and bolster embodying my invention. Fig. 2 is a front view of the center portion of a bolster and axle partly broken away to display my invention. Fig. 3 is a detail.

A is the axle, and B is the clip, which, fitting on the axle, is secured in place by the usual plate $a$ and nuts $b$ $b$. The upper portion of clip B is formed with an opening $c$ to receive the king-bolt $d$, that is put in place before the clip B is put on the axle, the head $d'$ of the king-bolt resting in a shouldered recess $f$. The opening $c$ above referred to is made through a lug B', that is formed on the upper portion of clip B, and which is rounded to fit in a corresponding recess in the under side of a wear-plate C, which has a squared opening through it to receive the squared portion $d^2$ of the king-bolt, which above its squared portion is screw-threaded to receive a nut $g$, that through king-bolt $d$ locks the clip B and wear-plate together. The center of wear-plate C is re-enforced, and this re-enforce is projected through an opening in the face-plate E of the bolster and into a recess in the bolster, and the plate is then secured to the bolster by a clip D and the connection between the front axle and bolster is made.

It will be observed that as the clip extends into the wear-plate the king-bolt is relieved of all cramping strain, and as that portion of the king-bolt that enters the wear-plate is square and fits in a square opening the king-bolt cannot turn to either tighten or loosen the securing-nut.

In my device the connections are all concealed, and there are no openings from above through which water may percolate to rot the bolster; and, besides, as the only connection between the king-bolt and bolster is through the wear-plate, the bolster can be removed by simply taking off the nuts of clip D, without disturbing the other parts.

Having thus described my invention, what I claim as new, and desire to secure by Letters Patent, is—

The combination, with a king-bolt and its clip, the latter having a rounded projection on its upper side through which the king-bolt passes, of a wear-plate fitting the round portion of the clip and having a squared opening through which a squared portion of the king-bolt passes, a nut for securing the king-bolt in the wear-plate, and means for securing the wear-plate to the bolster.

In testimony that I claim the foregoing I have hereunto set my hand, at Milwaukee, in the county of Milwaukee and State of Wisconsin, in the presence of two witnesses.

JOHN P. WECHSELBERG.

Witnesses:
   S. S. STOUT,
   WM. KLUG.